US011070476B2

(12) United States Patent
Connor et al.

(10) Patent No.: US 11,070,476 B2
(45) Date of Patent: Jul. 20, 2021

(54) MIGRATION FROM A LEGACY NETWORK APPLIANCE TO A NETWORK FUNCTION VIRTUALIZATION (NFV) APPLIANCE

(71) Applicant: Intel Corporation, Santa Clara, CA (US)

(72) Inventors: Patrick Connor, Beaverton, OR (US); Andrey Chilikin, Limerick (IE); Brendan Ryan, Limerick (IE); Chris MacNamara, Limerick (IE); John J. Browne, Limerick (IE); Krishnamurthy Jambur Sathyanarayana, Limerick (IE); Stephen Doyle, Ennis (IE); Tomasz Kantecki, Ennis (IE); Anthony Kelly, Limerick (IE); Ciara Loftus, County Galway G (IE); Fiona Trahe, Clarecastle (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/395,774

(22) Filed: Apr. 26, 2019

(65) Prior Publication Data
US 2019/0268269 A1    Aug. 29, 2019

(51) Int. Cl.
*H04W 56/00*    (2009.01)
*H04L 12/803*    (2013.01)
(Continued)

(52) U.S. Cl.
CPC .............. *H04L 47/125* (2013.01); *G06F 8/76* (2013.01); *G06F 9/455* (2013.01); *H04L 43/0817* (2013.01); *H04L 47/2441* (2013.01)

(58) Field of Classification Search
CPC .............. H04L 47/125; H04L 43/0817; H04L 47/2441; G06F 9/455
(Continued)

(56) References Cited

U.S. PATENT DOCUMENTS

2009/0129260 A1* 5/2009 Qian ..................... H04L 41/16
                                                370/216
2016/0261495 A1* 9/2016 Xia ....................... H04L 45/12
(Continued)

OTHER PUBLICATIONS

Extended European Search Report for Patent Application No. 20163755.0, dated Aug. 8, 2020, 8 pages.

*Primary Examiner* — Sai Ming Chan
(74) *Attorney, Agent, or Firm* — Compass IP Law PC

(57) ABSTRACT

A computing device includes an appliance status table to store at least one of reliability and performance data for one or more network functions virtualization (NFV) appliances and one or more legacy network appliances. The computing device includes a load controller to configure an Internet Protocol (IP) filter rule to select a packet for which processing of the packet is to be migrated from a selected one of the one or more legacy network appliances to a selected one of the one or more NFV appliances, and to update the appliance status table with received at least one of reliability and performance data for the one or more legacy network appliances and the one or more NFV appliances. The computing device includes a packet distributor to receive the packet, to select one of the one or more NFV appliances based at least in part on the appliance status table, and to send the packet to the selected NFV appliance. Other embodiments are described herein.

24 Claims, 5 Drawing Sheets

(51) Int. Cl.
  *G06F 9/455* (2018.01)
  *H04L 12/851* (2013.01)
  *H04L 12/26* (2006.01)
  *G06F 8/76* (2018.01)

(58) Field of Classification Search
  USPC .......................................................... 370/235
  See application file for complete search history.

(56) References Cited

U.S. PATENT DOCUMENTS

2018/0145916 A1\* 5/2018 Rao ........................ H04L 43/062
2019/0042297 A1   2/2019 Connor et al.
2019/0044799 A1   2/2019 Browne et al.
2019/0045037 A1   2/2019 Sukhomlinov et al.

\* cited by examiner

MIGRATION FROM A LEGACY NETWORK APPLIANCE TO A NETWORK FUNCTION VIRTUALIZATION (NFV) APPLIANCE

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). Such data networks typically have included complex, large-scale computing environments, such as high-performance computing (HPC) and cloud computing environments. Traditionally, those data networks have included dedicated hardware devices, commonly referred to as network appliances, configured to perform a single function, such as security (e.g., a firewall, authentication, etc.), network address translation (NAT), load-balancing, deep packet inspection (DPI), transmission control protocol (TCP) optimization, caching, Internet Protocol (IP) management, etc.

More recently, network operators and service providers are relying on various network virtualization technologies (e.g., network function virtualization (NFV)) to provide network functions as virtual services (e.g., firewall services, NAT services, load-balancing services, DPI services, authentication services, TCP optimization services, etc.) which can be executed by a virtualization platform on general purpose computing hardware. However, the transition from the legacy network appliances to the virtualization alternatives (e.g., NFV appliances) can result in downtime, the throttling of services, service disruption, etc., any of which can make the migration difficult, especially at scale.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
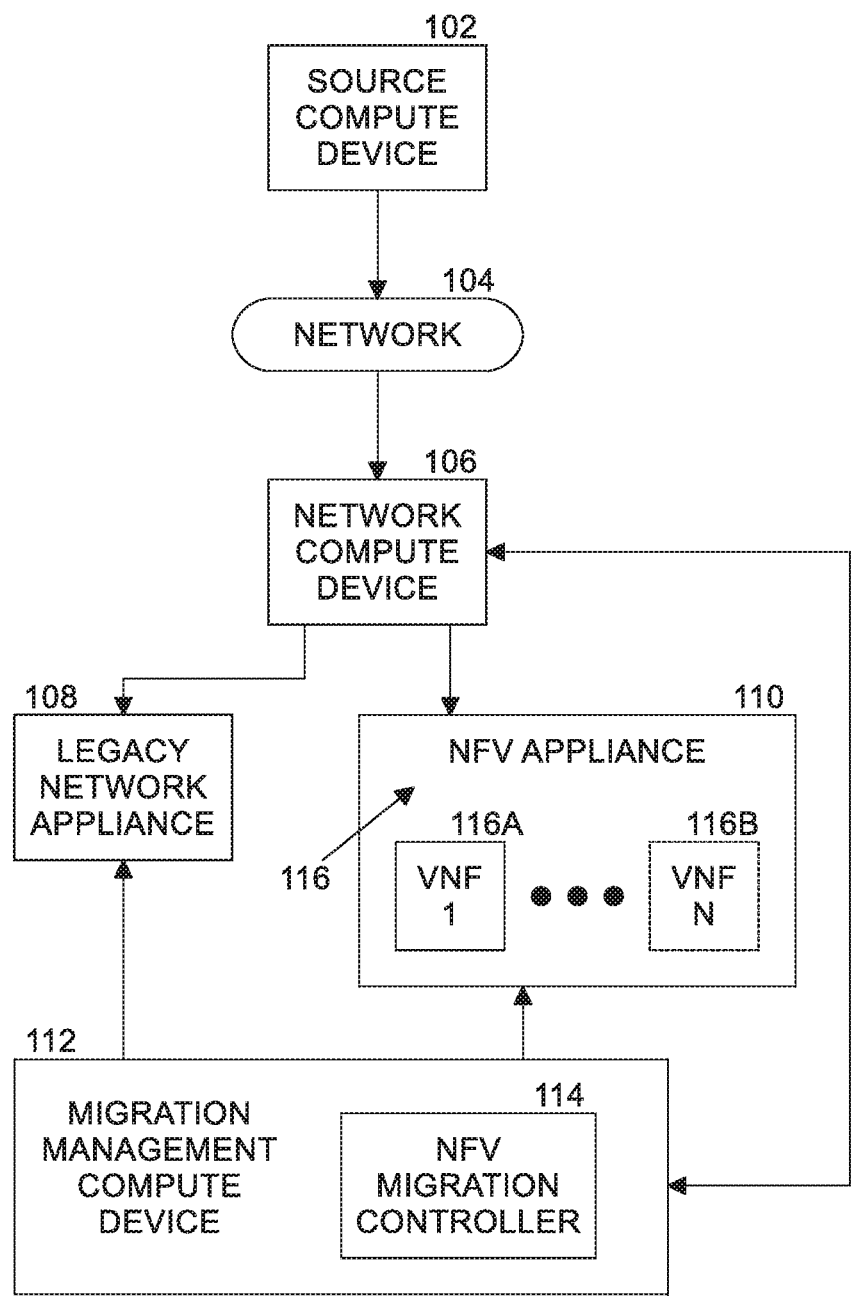
FIG. 1 is a simplified block diagram of at least one embodiment of a system for migrating a legacy network appliance to a network function virtualization (NFV) appliance that includes a network computing device and a migration management computing device, each of which are communicatively coupled to a legacy network appliance and an NFV appliance.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for migrating a legacy network appliance to a network functions virtualization (NFV) appliance includes a network compute device 106 and a migration management compute device 112, each of which are communicatively coupled to a legacy network appliance 108 and an NFV appliance 110. In traditional legacy networks, the network compute device 106 receives network packets (e.g., Ethernet frames, messages, etc.) from one or more source compute devices 102, via network 104 (e.g., the Internet), performs some level of processing on each received network packet, and then either drops the network packet or forwards the received network packets to a legacy network appliance (e.g., legacy network appliance 108), such that a network service or function can be performed thereon.

It should be appreciated that legacy network appliance 108 consists of proprietary, dedicated hardware which is configured to support a single network service being performed thereon. Such network services may include any type of network service, including firewall services, network address translation (NAT) services, domain name system (DNS) services, load-balancing services, deep packet inspection (DPI) services, transmission control protocol (TCP) optimization services, cache management services, Internet Protocol (IP) address management services, etc. It should be further appreciated that while only a single legacy network appliance 108 is shown, the system 100 may include multiple legacy network appliances 108, in other embodiments, each of which is configured to perform a single network service.

In use, the migration management compute device 112 is configured to manage the migration of individual network functions out of the proprietary, dedicated hardware (e.g., the legacy network appliance 108) and into software (e.g., packaged as virtual machines (VMs) or containers running one or more VNF instances) which runs on commodity computing system hardware of the NFV appliance 110 (e.g., a computer server). To do so, migration management compute device 112 identifies configuration information and operational parameters of a legacy network appliance 108 that is to be migrated to an NFV appliance (e.g., the NFV appliance 110). Migration management compute device 112 then deploys, configures, and brings into service a virtual network function (VNF) instance 116 on the NFV appliance 110 that is equivalent to the function/operation of the legacy network appliance 108 being replaced.

In NFV architecture, a VNF is configured to handle specific network functions that run in one or more VMs or containers on top of computer system hardware networking infrastructure traditionally carried out by proprietary, dedicated hardware (e.g., legacy network appliance 108), such as routers, switches, servers, cloud computing systems, etc. Further, a VM is a software program or operating system that not only exhibits the behavior of a separate computer, but is also capable of performing tasks such as running applications and programs like a separate computer. A VM, commonly referred to as a "guest," is typically configured to run a dedicated operating system on shared physical hardware resources of the device on which the VM has been deployed, commonly referred to as a "host." Multiple virtual machines can exist within a single host at one time.

It should be appreciated that each VNF instance 116 may be embodied as one or more VMs or containers configured to execute corresponding software or instructions to perform a virtualized task. In other words, VNF instances 116 move individual network functions out of dedicated hardware devices into software that can run on commodity hardware. Such tasks can include performing specific network functions that run on one or more VMs. For example, the VNF tasks may include one or more of the previously described services, including firewall services, DNS services, NAT services, load-balancing services, DPI services, TCP optimization services, cache management services, IP address management services, etc. As illustratively shown, the NFV appliance 110 includes one or more VNF instances 116. The illustrative VNF instances 116 include a first VNF instance 116 designated as VNF (1) 116a and, depending on the embodiment, may also include one or more additional VNF instances 116, illustratively designated as VNF (N) 116b (e.g., in which the VNF (N) 116b represents the "Nth" VNF instance 116, and wherein "N" is a positive integer).

Migration management compute device 112 additionally performs the migration operation between legacy network appliance 108 and the NFV appliance 110 by coordinating the service exit of legacy network appliance 108 and redirecting network traffic to VNF instance 116 of NFV appliance 110 deployed for the migration. As such, the migration can be performed by migration management compute device 112 with minimal service interruption in an automated manner. Finally, migration management compute device 112 is configured to verify the health and performance of NFV appliance 110 and associated VNF instance 116 to ensure the migration has been successful. It should be appreciated that, if the migration has been determined to be unsuccessful, migration management compute device 112 is further configured to roll back the migration operation and ensure the configuration and operational parameters of legacy network appliance 108 are restored.

Migration management compute device 112 may be embodied as any type of computation or computer device capable of performing the functions described herein, including, without limitation, a server (e.g., stand-alone, rack-mounted, blade, sled, etc.), switch (e.g., a disaggregated switch, a rack-mounted switch, a standalone switch, a fully managed switch, a partially managed switch, a full-duplex switch, and/or a half-duplex communication mode enabled switch), a router, a network appliance (e.g., physical or virtual), a web appliance, a processor-based system, and/or a multiprocessor system. Additionally, in some embodiments, migration management compute device 112 may be embodied as a distributed computing system. In such embodiments, migration management compute device 112 may be embodied as more than one computing device in which each computing device is configured to perform at least a portion of the functions described herein.

Figure 2:
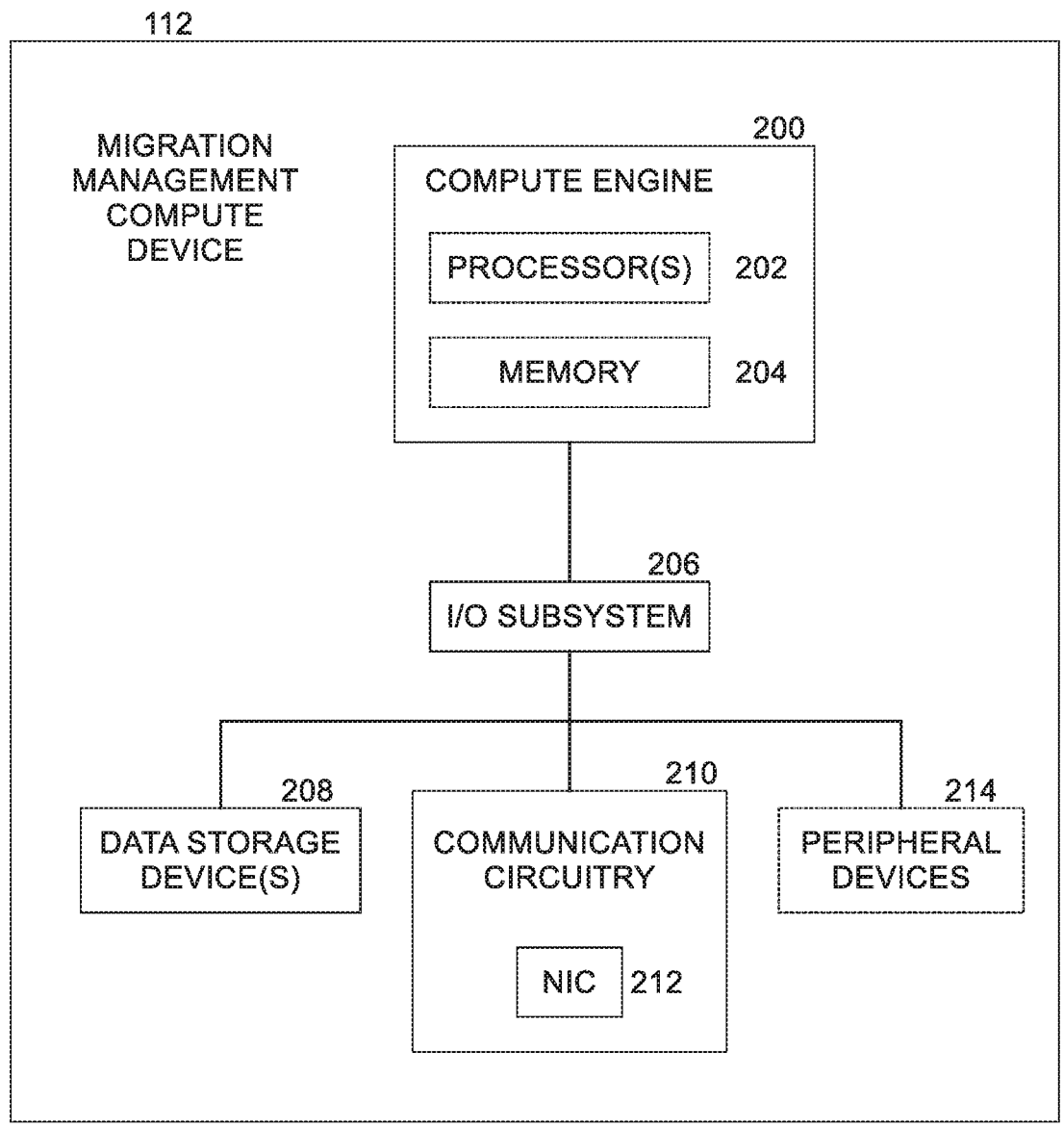
FIG. 2 is a diagram of at least one embodiment of the migration management computing device of the system of FIG. 1.

Referring now to FIG. 2, an illustrative migration management compute device 112 includes a compute engine 200, an input/output (I/O) subsystem 206, one or more data storage devices 208, communication circuitry 210, and, in some embodiments, one or more peripheral devices 214. It should be appreciated that migration management compute device 112 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

Compute engine 200 may be embodied as any type of device or collection of devices capable of performing the various compute functions as described herein. In some embodiments, compute engine 200 may be embodied as a single device such as an integrated circuit, an embedded system, a field-programmable-array (FPGA) (e.g., reconfigurable circuitry), a system-on-a-chip (SOC), an application specific integrated circuit (ASIC), reconfigurable hardware or hardware circuitry, or other specialized hardware to facilitate performance of the functions described herein. Additionally, in some embodiments, compute engine 200 may include, or may be embodied as, one or more processors 202 (e.g., one or more central processing units (CPUs)) and memory 204.

Processor(s) 202 may be embodied as any type of processor capable of performing the functions described herein. For example, processor(s) 202 may be embodied as one or more single-core processors, one or more multi-core processors, a digital signal processor, a microcontroller, or other processor or processing/controlling circuit(s). In some embodiments, processor(s) 202 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

Memory 204 may be embodied as any type of volatile or non-volatile memory or data storage capable of performing the functions described herein. It should be appreciated that memory 204 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

Compute engine 200 is communicatively coupled to other components of the migration management compute device 112 via I/O subsystem 206, which may be embodied as circuitry and/or components to facilitate input/output operations with processor 202, memory 204, and other components of migration management compute device 112. For example, I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, I/O subsystem 206 may form a portion of a system-on-a-chip (SoC) and be incorporated, along with one or more of processor 202, memory 204, and other components of migration management compute device 112, on a single integrated circuit chip.

One or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device. Each data storage device 208 may also include an operating system partition that stores data files and executables for an operating system.

Communication circuitry 210 may be embodied as any communication circuit, device, or collection thereof, capable of enabling communications between migration management compute device 112 and other computing devices, as well as any network communication enabling devices, such as a gateway, an access point, a network switch/router, etc., to allow communication over the network 104. Accordingly, communication circuitry 210 may be configured to use any one or more communication technologies (e.g., wireless or wired communication technologies) and associated protocols (e.g., Ethernet, Bluetooth®, Wi-Fi®, WiMAX, long term evolution (LTE), 5G, etc.) to effect such communication. It should be appreciated that, in some embodiments, communication circuitry 210 may include specialized circuitry, hardware, or combination thereof to perform pipeline logic (e.g., hardware algorithms) for performing at least a portion of the functions described herein. Additionally or alternatively, one or more of the functions of communication circuitry 210 as described herein may be performed by specialized circuitry, hardware, or combination thereof embodied as a system-on-a-chip (SoC) or otherwise form a portion of a SoC of migration management compute device 112 (e.g., incorporated on a single integrated circuit chip along with a processor 202, memory 204, and/or other components of migration management compute device 112). Alternatively, in some embodiments, the specialized circuitry, hardware, or combination thereof may be embodied as one or more discrete processing units of migration management compute device 112, each of which may be capable of performing one or more of the functions described herein.

The illustrative communication circuitry 210 includes a network interface controller (NIC) 212, also commonly referred to as a host fabric interface (HFI) in some embodiments (e.g., high-performance computing (HPC) environments). NIC 212 may be embodied as one or more add-in-boards, daughtercards, network interface cards, controller chips, chipsets, or other devices that may be used by the migration management compute device 112. In some embodiments, NIC 120 may be embodied as part of a system-on-a-chip (SoC) that includes one or more processors or included on a multichip package that also contains one or more processors. In some embodiments, NIC 120 may include a local processor (not shown) and/or a local memory (not shown) that are both local to NIC 120. In such embodiments, the local processor of NIC 120 may be capable of performing one or more of the functions of a processor 202 described herein.

Additionally, or alternatively, in such embodiments, the local memory of NIC 120 may be integrated into one or more components of migration management compute device 112 at the board level, socket level, chip level, and/or other levels. For example, in some embodiments, NIC 212 may be integrated with processor 202, embodied as an expansion card coupled to the I/O subsystem 206 over an expansion bus (e.g., peripheral component interconnect express (PCI Express)), part of a SoC that includes one or more processors, or included on a multichip package that also contains one or more processors. Additionally, or alternatively, in some embodiments, functionality of NIC 212 may be integrated into one or more components of migration management compute device 112 at the board level, socket level, chip level, and/or other levels.

One or more peripheral devices 214 may include any type of device that is usable to input information into migration management compute device 112 and/or receive information from migration management compute device 112. Peripheral devices 214 may be embodied as any auxiliary device usable to input information into migration management compute device 112, such as a keyboard, a mouse, a microphone, a barcode reader, an image scanner, etc., or output information from migration management compute device 112, such as a display, a speaker, graphics circuitry, a printer, a projector, etc. It should be appreciated that, in some embodiments, one or more of the peripheral devices 214 may function as both an input device and an output device (e.g., a touchscreen display, a digitizer on top of a display screen, etc.). It should be further appreciated that the types of peripheral devices 214 connected to the migration management compute device may depend on, for example, the type and/or intended use of the migration management compute device. Additionally, or alternatively, in some embodiments, peripheral devices 214 may include one or more ports, such as a USB port, for example, for connecting external peripheral devices to migration management compute device 112.

Referring back to FIG. 1, source compute device 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system. Network compute device 106 may be embodied as any type of computation or computer device capable of performing the functions described herein, including, without limitation, a server (e.g., stand-alone, rack-mounted, blade, sled, etc.), switch (e.g., a disaggregated switch, a rack-mounted switch, a standalone switch, a fully managed switch, a partially managed switch, a full-duplex switch, and/or a half-duplex communication mode enabled switch), a router, a gateway, a network appliance (e.g., physical or virtual), a web appliance, a distributed computing system, a processor-based system, and/or a multiprocessor system.

While not illustratively shown, it should be appreciated that source compute device 102 and network compute device 106 may include similar and/or like components to those of illustrative migration management compute device 112. As such, figures and descriptions of those components are not repeated herein for clarity of the description with the understanding that the description of the corresponding components provided above in regard to migration management compute device 112 applies equally to the corresponding components of source compute device 102 and network compute device 106. Of course, it should be appreciated that source compute device 102 and network compute device 106 may include additional and/or alternative components, depending on the embodiment. In an embodiment, migration management computer device 112 is implemented as part of network compute device 106.

Network 104 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, network 104 may serve as a centralized network and, in some embodiments, may be communicatively coupled to another network (e.g., the Internet). Accordingly, network 104 may include a variety of other virtual and/or physical network computing devices (e.g., routers, switches, network hubs, gateways, servers, storage devices, compute devices, (high-speed) interconnects, etc.), as needed to facilitate communication between source compute devices 102 and network compute device 106, which are not shown to preserve clarity of the description.

Figure 3:
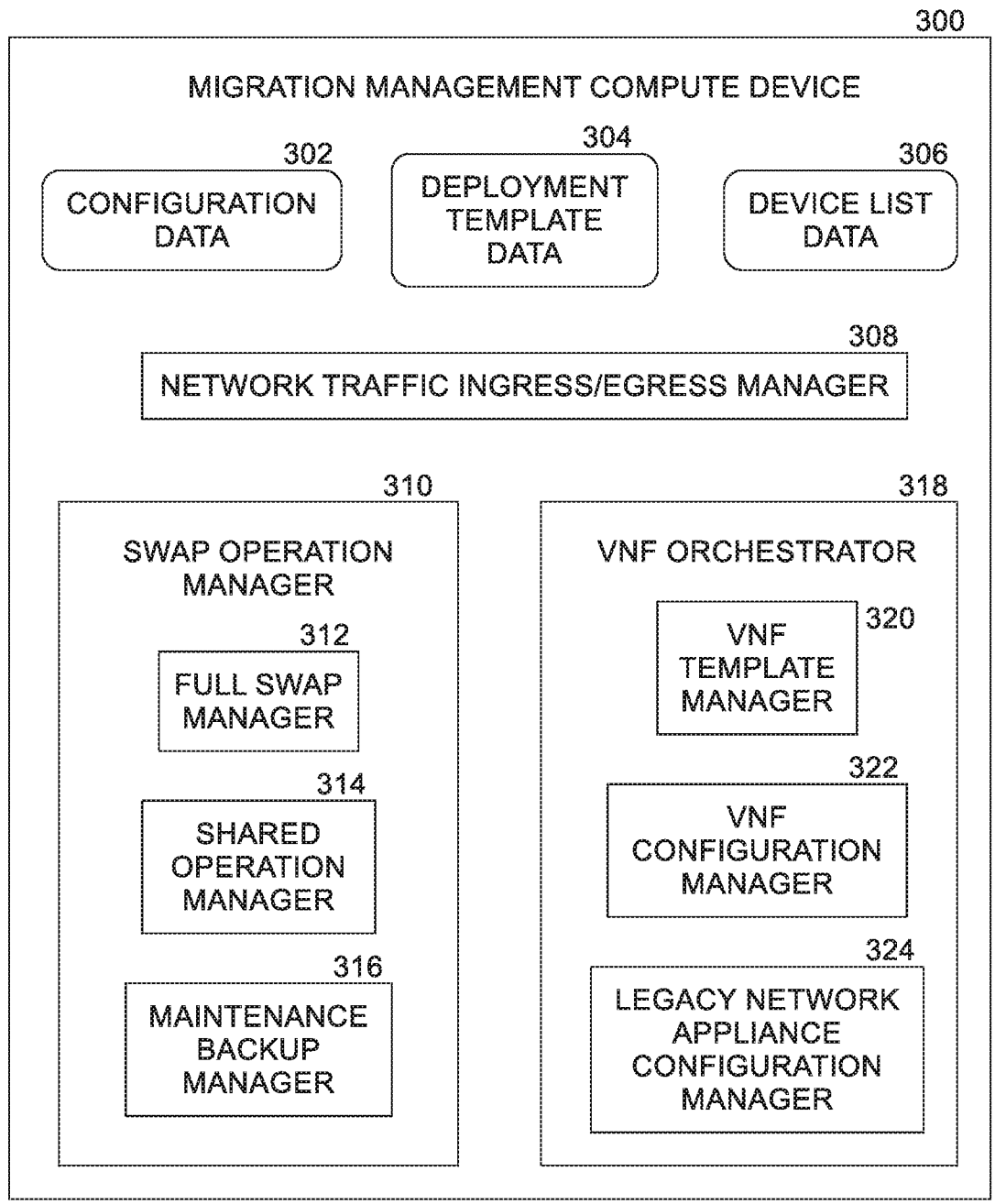
FIG. 3 is a simplified block diagram of at least one embodiment of an environment of the migration management computing device of the system of FIG. 1.

Referring now to FIG. 3, in use, migration management compute device 112 establishes an environment 300 during operation. The various components of the environment 300 may be embodied as hardware, firmware, software, or a combination thereof. As such, in some embodiments, one or more of the components of environment 300 may be embodied as circuitry or collection of electrical devices.

It should be appreciated that, in such embodiments, one or more of the network traffic ingress/egress management circuitry 308, the swap operation manager circuitry 310, and the VNF orchestrator circuitry 318 may form a portion of one or more of compute engine 200, I/O subsystem 206, communication circuitry 210 (e.g., NIC 212 of the communication circuitry 210), and/or other components of migration management compute device 112. Additionally, in some embodiments, one or more of the illustrative components may form a portion of another component and/or one or more of the illustrative components may be independent of one another. Further, in some embodiments, one or more of the components of environment 300 may be embodied as virtualized hardware components or emulated architecture, which may be established and maintained by compute engine 200 or other components of migration management compute device 112. It should be appreciated that migration management compute device 112 may include other components, sub-components, modules, sub-modules, logic, sub-logic, and/or devices commonly found in a computing device, which are not illustrated in FIG. 3 for clarity of the description.

In the illustrative environment 300, migration management compute device 112 additionally includes configuration data 302, deployment template data 304, and device list data 306, each of which may be accessed by the various components and/or sub-components of migration management compute device 112. It should be appreciated that, in some embodiments, the data stored in or otherwise represented by each of configuration data 302, deployment template data 304, and device list data 306 may not be mutually exclusive relative to each other. Additionally, it should be further appreciated that in some embodiments at least a portion of the data stored in, or otherwise represented by, configuration data 302, deployment template data 304, and/or device list data 306 may be stored in additional or alternative storage locations (e.g., host memory of migration management compute device 112 relative to memory local to NIC 212). As such, although the various data utilized by migration management compute device 112 is described herein as particular discrete data, such data may be combined, aggregated, and/or otherwise form portions of a single or multiple data sets, including duplicative copies, in other embodiments.

Network traffic ingress/egress manager 308, which may be embodied as hardware, firmware, software, virtualized hardware, emulated architecture, and/or a combination thereof as discussed above, is configured to receive inbound and route/transmit outbound network traffic. To do so, network traffic ingress/egress manager 308 is configured to facilitate inbound/outbound network communications (e.g., network traffic, network packets, network flows, etc.) to and from migration management compute device 112. For example, network traffic ingress/egress manager 308 is configured to manage (e.g., create, modify, delete, etc.) connections to physical and virtual network ports (i.e., virtual network interfaces) of migration management compute device 112 (e.g., via the communication circuitry 210), as well as the ingress/egress buffers/queues associated therewith.

Network traffic ingress/egress manager 308 is additionally configured to maintain a device list 306 which maintains the IP addresses of those legacy network appliances 108 and VNF instances 116 for which migration management compute device 112 is communicatively coupled. In some embodiments, the IP addresses, as well as other identifying information, may be stored in device list data 306.

The swap operation manager 310, which may be embodied as hardware, firmware, software, virtualized hardware, emulated architecture, and/or a combination thereof as discussed above, is configured to manage the migration operation between a legacy network appliance (e.g., legacy network appliance 108 of FIG. 1) and an NFV appliance (e.g., NFV appliance 110 of FIG. 1), or more particularly a VNF instance (e.g., one of VNF instances 116 of FIG. 1) of NFV appliance 110. To do so, the illustrative swap operation manager 310 includes a full swap manager 312, a shared operation manager 314, and a maintenance backup manager 316.

The full swap manager 312 is configured to manage a full swap operation. To do so, the full swap manager 312 is configured to swap the legacy network appliance 108 with the NFV appliance 110. More particularly, the full swap manager 312 is configured to substitute the legacy network appliance 108 with a VNF instance 116 of the NFV appliance 110 and remove the legacy network appliance 108 upon having determined the full swap operation has been successful. The full swap manager 312 is additionally configured to roll back to the substituted legacy network appliance 108 in the event the full swap operation was determined to be unsuccessful.

In some embodiments, the full swap manager 312 may be configured to maintain a list of IP addresses and VNF instances 116 which can be automatically swapped from a legacy network appliance 108 to a VNF instance 116 and/or a list of IP addresses and VNF instances 116 which have been swapped from legacy network appliances 108 to VNF instances 116. Accordingly, in such embodiments, in the event of a swap fail, one or more of the swapped VNF instances 116 can be rolled back to the applicable legacy network appliance 108 (e.g., based on the corresponding configuration) as a function of the list mapping. Further, in such embodiments, a chain of available/swapped VNF instances 116 can be recorded and, if one VNF instance 116 fails, a number of preselected VNF instances 116 in the list (e.g., those VNF instances 116 in the chain after the failed VNF instance 116) can optionally be rolled back to their respective legacy network appliances 108.

The shared operation manager 314 is configured to manage a shared swap operation. To do so, the shared operation manager 314 is configured to deploy the NFV appliance 110, or more particularly a VNF instance 116 of the NFV appliance 110, to handle a portion of the network traffic and configure the legacy network appliance 108 to handle a portion of the network traffic. The shared operation manager 314 is additionally configured to monitor the health and performance of both the legacy network appliance 108 and the VNF instance 116 such that upon a detected failure all network traffic can be routed to the non-failing one of the legacy network appliance 108 and the VNF instance 116.

The maintenance backup manager 316 is configured to manage a maintenance backup operation. It should be appreciated that the maintenance being performed may be to the legacy network appliance 108 or the NFV appliance 110. Accordingly, the maintenance backup manager 316 is configured to manage the maintenance backup operation for either condition. To manage the maintenance backup operation for the legacy network appliance 108 using a VNF instance 116, the maintenance backup manager 316 is configured to, similar to the full swap operation (e.g., managed by the full swap manager 312), manage the configuration and deployment of a VNF instance 116 on a NFV appliance 110 such that the VNF instance 116 can handle all of the network traffic until the network traffic management can be reverted back to the legacy network appliance 108 (e.g., maintenance on the legacy network appliance 108 has completed). To manage the maintenance backup operation for the NFV appliance 110 using a legacy network appliance 108, the maintenance backup manager 316 is configured to manage the configuration of the legacy network appliance 108 such that the legacy network appliance 108 can handle all of the network traffic that would otherwise be routed to the applicable VNF instance 116 of the NFV appliance 110 until the network traffic management can be reverted back to the applicable VNF instance 116 of the NFV appliance 110 (e.g., maintenance on the NFV appliance 110 has completed).

It should be appreciated that the swap operation manager 310 may be additionally configured to verify whether the requested operation (e.g., the full swap operation, the shared operation, or the maintenance backup operation) was successful or not. To do so, the swap operation manager 310 may be configured to verify health and performance levels of the VNF instance 116 of the NFV appliance 110 deployed for the swap operation subsequent to the swap operation having been performed. In some embodiments, the swap operation manager 310 may additionally be configured to track a status (e.g., successful or unsuccessful) of each operation and/or report the status of each operation to an administrator and/or other management and orchestration device.

The VNF orchestrator 318 is configured to manage the configuration and deployment of the VNF instances 116 on the respective NFV appliances 110. To do so, the illustrative VNF orchestrator 318 includes a VNF template manager 320, a VNF configuration manager 322, and a legacy network appliance configuration manager 324. The VNF template manager 320 is configured to manage a set of predefined VNF deployment templates 304 usable to configure and deploy VNF instances 116. Each of the VNF deployment templates 304 includes one or more resource fields and one or more network configuration fields usable to match the resource configuration settings and operational parameters of the legacy network appliance 108 to the configuration of the VNF instances 116.

The VNF configuration manager 322 is configured to manage the configuration of the VNF instances 116 (e.g., based on the resource configuration settings of the VNF deployment template). The set of VNF deployment templates includes a predefined default VNF deployment template from which configuration decisions can be made from a predefined decision tree. Accordingly, the VNF configuration manager 322 is additionally configured to configure the VNF instances 116 instantiated using the predefined default VNF deployment template and the predefined decision tree.

The legacy network appliance configuration manager 324 is configured to manage the resource configuration settings 302 and operational parameters for the legacy network appliance 108. To do so, the legacy network appliance configuration manager 324 is configured to identify or otherwise retrieve (e.g., via an interrogation) the configuration information and operational parameters of the legacy network appliance 108. The configuration information and operational parameters may include any information necessary to replicate the operational conditions of the legacy network appliance 108, including required resources, network configuration information, and any other information usable to configure a corresponding VNF instance 116 to perform operationally the same as the legacy network appliance 108 for which it is being swapped.

Accordingly, the configuration information may include any resource configuration settings of the legacy network appliance 108 which might be required to replicate configuration of the corresponding VNF instance 116, such as the amount of resources (e.g., compute, storage, etc.) to be allocated. The operational parameters may include any information of the network interfaces of the legacy network appliance 108 which may be usable to usable to configure the corresponding network interfaces of the VNF instance 116, such as, but not limited to, a number of connections per second, mean throughput, max throughput, etc. The legacy network appliance configuration manager 324 may be configured to use any standard network management protocol, such as Simple Network Management Protocol (SNMP), Network Configuration Protocol (NETCONF), etc. In some embodiments, the configuration information and/or the operational parameters may be stored in the configuration data 302.

Figure 4:
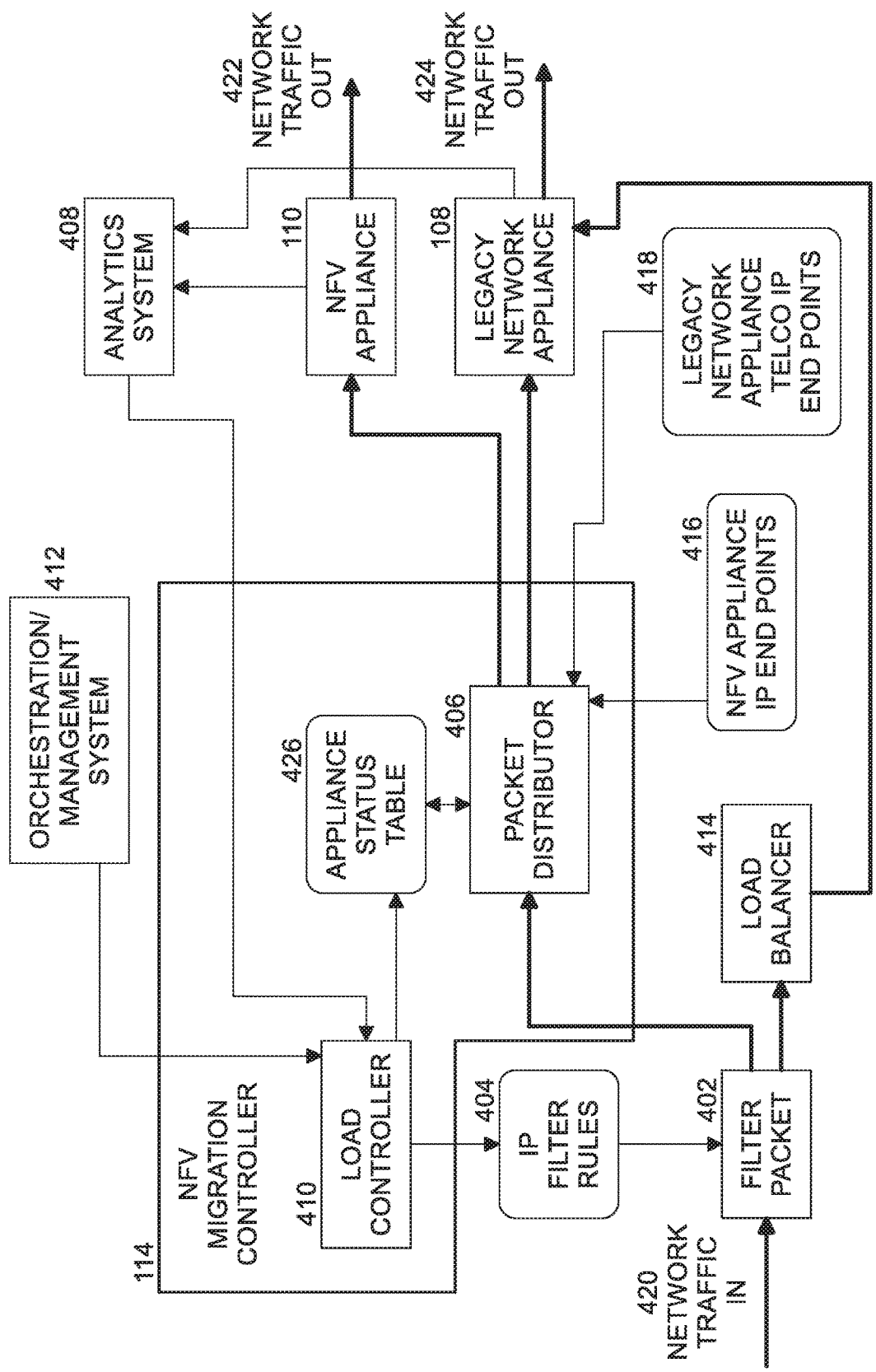
FIG. 4 is a diagram of at least one embodiment of an environment of the migration management computing device of the system of FIG. 1.

FIG. 4 is a diagram of at least one embodiment of an environment 400 of the NFV migration controller 114 of the system 100 of FIG. 1. Packets for network traffic coming in 420 to network compute device 106 are input to filter packet component 402. In an embodiment, filter packet component 402 is part of a switch or router. Filter packet component 402 applies one or more Internet protocol (IP) filter rules 404 to filter the incoming packets.

Embodiments of the present invention add a new IP filter rule, identified by a new action, which filters the packet traffic and applies a new action which identifies the packet traffic as part of a legacy to NFV distribution set (or group). Filter packet component 402 examines the packet based on programmable IP packet parameters including L3-L7 header information, Quality of Service (QoS) information (such as differentiated services control point (DSCP)), and Telecommunications Protocol type (such as General Packet Radio Service (GPRS) Tunneling Protocol (GTP-U), and Stream Control Transmission protocol (SCTP)), and based on the match to a pre-configured pattern provided by orchestration/management system 412 and load controller 410, sends the packet to packet distributor 406, along with metadata of the matching rule, which indicates the group of one or more associated legacy network appliances 108 and one or more NFV appliances 110 assigned to this traffic type. Application of the IP filter rules can identify new connections by examining packet attributes against pre-existing flows and determine if the packet represents a new connection or an existing connection and includes this indication in the metadata.

Orchestration/management system 412 selects and/or configures the new IP filter rule. In an embodiment, orchestration/management system 412 provides a user interface (UI) or other mechanism for a system administrator to specify IP filter rules. The new IP filter rule is passed to load controller 410 in NFV migration controller 114. Load controller 410 updates IP filter rules 404 with the new IP filter rule. In an embodiment, load controller 410 further configures or modifies the new IP filter rule as needed. In an embodiment, load controller 410 also sets thresholds for reliability and performance status of NFV appliances 110 and legacy network appliances 108 in appliance status table 426.

If the incoming packet does not match the new IP filter rule, then existing packet processing is performed. Depending on IP filter rules, the packet may be processed by load balancer 414 and sent to a legacy network appliance 108, which transmits the packet as outgoing network traffic 424. Depending on IP filter rules and packet metadata, the packet may be passed in an embodiment through packet distributor 406 to a legacy network appliance 108, which transmits the packet as outgoing network traffic 424.

If the packet does match the new IP filter rule (meaning the packet is part of a selected or configured legacy to NFV group), then the packet is passed by filter packet component 402 to packet distributor 406. Packet distributor 406 reads appliance status table 426 to determine which one of a set of NFV appliances 110 or one of a set of legacy network appliances 108 is to receive the packet. In an embodiment, a packet which is part of a legacy to NFV group will be sent, if possible, to a selected NFV appliance, based at least in part on the reliability and/or performance status information stored in appliance status table 426 for each NFV appliance and each legacy network appliance, and on metadata contained in the packet. Packet distributor 406 uses NFV appliance IP end points 416 to route packets to a selected NFV appliance 110, and legacy network appliance telco IP end points 418 to route packets to a selected legacy network appliance 108. Either NFV appliance 110 transmits the packet as outgoing network traffic 422 or legacy network appliance 108 transmits the packet as outgoing network traffic 424, depending on the distribution of the packet by packet distributor 406. Packet distributor 406 can optionally choose to send pre-existing connections to the same appliances to keep the connections alive and send new connections to more reliable appliances. Optionally, periodically load controller 410 can change/update the reliability information stored for NFV appliances in appliance status table 426 if no new faults occur, thereby allowing more traffic to be distributed to NFV appliances that have become more reliable or exhibiting better performance over time.

Embodiments of the present invention provide a reliability and/or performance feedback loop to NFV migration controller 114 processing. As NFC appliances 110 and legacy network appliances 108 process packets, NFC appliances 110 and legacy network appliances 108 send raw reliability and/or performance metrics information to analytics system 408. Analytics system 408 processes the raw reliability and/or performance metrics information into a form suitable for transfer to legacy to load controller 410. In an embodiment, the frequency of transferring reliability and/or performance information and the content of the reliability and/or performance information is implementation dependent. In an embodiment, analytics system 408 indicates trend metrics and anomalies in the feedback loop to load controller 410. Load controller 410 receives the reliability and/or performance information and updates appliance status table 426 for the entry associated with the reporting NFC appliance 110 or legacy network appliance 108. In this way the appliance status table 426 keeps track of the current status of packet processing by the NFV appliances 110 and the legacy network appliances 108 in the system. This continually updated information is then used by packet distributor 406 to dynamically make distribution decisions for routing packet traffic to selected NFV appliances 110 or legacy network appliances 108 with the latest reliability and/or performance information, thus improving overall performance of the system and supporting increased migration of packet traffic from legacy network appliances to NFV appliances.

Reliability and/or performance metrics information includes faults and performance metrics such as equipment (e.g., hardware) fault metrics, software metrics, virtualization environment fault metrics, network interface fault metrics, and any other suitable indications of packet processing performance by NFV appliances or legacy network appliances.

Figure 5:
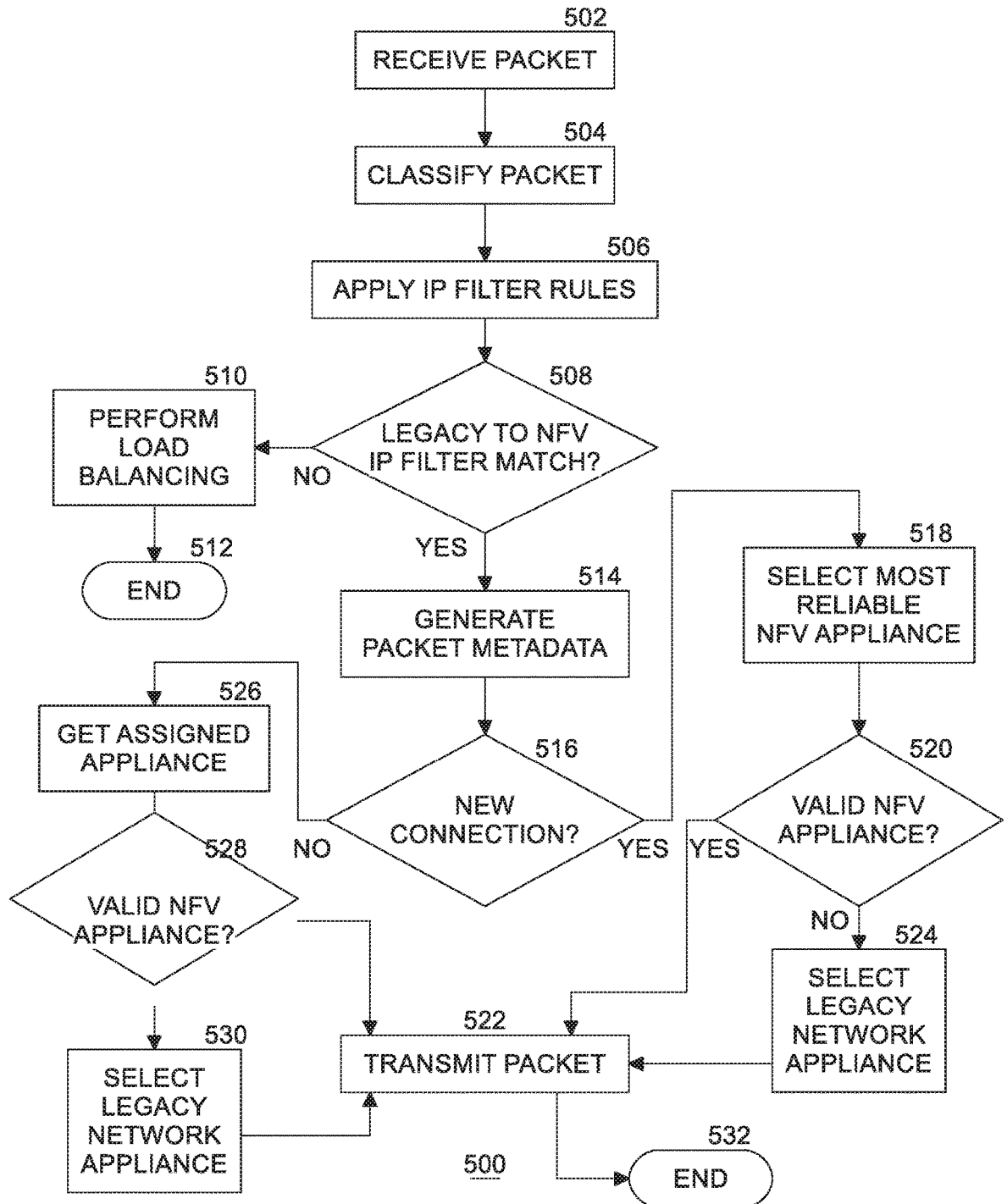
FIG. 5 is a flow diagram of at least one embodiment of a method for distributing packets.

FIG. 5 is a flow diagram 500 of at least one embodiment of a method for distributing packets. At block 502, a packet is received. At block 504, the packet is classified. At block 506, IP filter rules are applied to the packet (e.g., RFC 3704/2827 range filtering). If the new legacy to NFV IP filter rule of embodiments of the present invention does not match the packet at block 508, then load balancing using link aggregation control protocol (LCAP) or similar methods is performed at block 510 by load balancer 414, and the packet is sent to a legacy network appliance 108 for further processing. Processing of the packet ends at block 512. In an embodiment, blocks 502, 504, 506, and 508 are performed by filter packet component 402.

If the new legacy to NFV IP filter rule of embodiments of the present invention does match the packet at block 508 (indicating that the new IP filter/action pair identifies the packet as part of a legacy to NFV distribution set or group, whereby processing of the packet should be migrated to a NFV appliance, if possible), then packet metadata is generated at block 514. In an embodiment, the metadata includes packet classification information and an associated NFV/legacy network appliance distribution set or group (including new connection status). The packet metadata and the packet are sent to packet distributor 406.

At block 516, if a new connection is indicated for the packet (e.g., by the metadata), then an NFV appliance is selected at block 518 from a list of NFV appliances in appliance status table 426. In an embodiment, the most reliable NFV appliance is selected based at least in part on the appliance status table information. If the selected NFV appliance is valid at block 520, then the packet is transmitted to the selected NFV appliance at block 522. In an embodiment, a validity check includes checking the reliability and/or performance status of the NFV appliance. In other embodiments, other validity checks may be used. Processing of the packet ends at block 532. If at block 520 the selected NFV appliance is invalid or there are no NFV appliances that meet the required reliability and/or performance status as indicated by appliance status table 426, then a legacy network appliance is selected at block 524. The packet is transmitted to the selected legacy network appliance at block 522 and processing of the packet ends at block 532.

Returning to block 516, if a new connection is not indicated for the packet (e.g., by the metadata), then a previously assigned NFV appliance is obtained at block 526 from a list of NFV appliances in appliance status table 426. This occurs for subsequent packets for the connection other than the first packet. If the NFV appliance is valid at block 528, then the packet is transmitted to the selected NFV appliance at block 522. Processing of the packet ends at block 532. If at block 528 the selected NFV appliance is invalid or there are no NFV appliances that meet the required reliability and/or performance status as indicated by appliance status table 426, then a legacy network appliance is selected at block 530. The packet is transmitted to the selected legacy network appliance at block 522 and processing of the packet ends at block 532.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
configuring a packet migration Internet Protocol (IP) filter rule to select packets for which processing of the packets is to be migrated from a proprietary dedicated hardware legacy network appliance to a selected one of one or more network function virtualization (NFV) appliances;
receiving a packet;
applying the packet migration IP filter rule to the received packet;

when the received packet does not match the packet migration IP filter rule, sending the received packet to the proprietary dedicated hardware legacy network appliance for processing of the received packet; and when the received packet does match the packet migration IP filter rule:
generating metadata for the packet, the packet metadata including a set of proprietary dedicated hardware legacy network appliance to NFV appliances distributions;
selecting a most reliable NFV appliance from the set based at least in part on the packet metadata;
determining if the selected most reliable NFV appliance is valid;
when the selected most reliable NFV appliance is valid, sending the received packet to the selected most reliable NFV appliance for processing of the received packet; and
when the selected most reliable NFV appliance is not valid, sending the received packet to the proprietary dedicated hardware legacy network appliance for processing of the received packet.

2. The method of claim 1, comprising updating an appliance status table with performance metrics data generated by processing the received packet by the proprietary dedicated hardware legacy network appliance or the selected most reliable NFV appliance.

3. The method of claim 2, comprising selecting the most reliable NFV appliance from the set based at least in part on the packet metadata and the performance metrics data from the appliance status table.

4. The method of claim 3, comprising determining if the selected most reliable NFV appliance is valid by checking if updated performance metrics data for the selected most reliable NFV appliance meets a threshold.

5. At least one non-transitory machine-readable medium comprising a plurality of instructions that in response to being executed by a processor cause the processor to:
configure a packet migration Internet Protocol (IP) filter rule to select packets for which processing of the packets is to be migrated from a proprietary dedicated hardware legacy network appliance to a selected one of one or more network function virtualization (NFV) appliances;
receive a packet;
apply the packet migration IP filter rule to the received packet;
when the received packet does not match the packet migration IP filter rule, send the received packet to the proprietary dedicated hardware legacy network appliance for processing of the received packet; and
when the received packet does match the packet migration IP filter rule:
generate metadata for the packet, the packet metadata including a set of proprietary dedicated hardware legacy network appliance to NFV appliances distributions;
select a most reliable NFV appliance from the set based at least in part on the packet metadata;
determine if the selected most reliable NFV appliance is valid;
when the selected most reliable NFV appliance is valid, send the received packet to the selected most reliable NFV appliance for processing of the received packet; and
when the selected most reliable NFV appliance is not valid, send the received packet to the proprietary dedicated hardware legacy network appliance for processing of the received packet.

6. The at least one non-transitory machine-readable medium of claim 5, comprising instructions that in response to being executed by the processor cause the processor to update an appliance status table with performance metrics data generated by processing the received packet by the proprietary dedicated hardware legacy network appliance or the selected most reliable NFV appliance.

7. The at least one non-transitory machine-readable medium of claim 6, comprising instructions that in response to being executed by the processor cause the processor to select the most reliable NFV appliance from the set based at least in part on the packet metadata and the performance metrics data from the appliance status table.

8. The at least one non-transitory machine-readable medium of claim 7, comprising instructions that in response to being executed by the processor cause the processor to determine if the selected most reliable NFV appliance is valid by checking if updated performance metrics data for the selected most reliable NFV appliance meets a threshold.

9. A computing device comprising:
a packet filter to configure a packet migration Internet Protocol (IP) filter rule to: select packets for which processing of the packets is to be migrated from a proprietary dedicated hardware legacy network appliance to a selected one of one or more network function virtualization (NFV) appliances, to receive a packet, and to apply the packet migration IP filter rule to the received packet; and
an NFV migration controller to:
when the received packet does not match the packet migration IP filter rule, send the received packet to the proprietary dedicated hardware legacy network appliance for processing of the received packet; and
when the received packet does match the packet migration IP filter rule:
generate metadata for the packet, the packet metadata including a set of proprietary dedicated hardware legacy network appliance to NFV appliances distributions;
select a most reliable NFV appliance from the set based at least in part on the packet metadata;
determine if the selected most reliable NFV appliance is valid;
when the selected most reliable NFV appliance is valid, send the received packet to the selected most reliable NFV appliance for processing of the received packet; and
when the selected most reliable NFV appliance is not valid, send the received packet to the proprietary dedicated hardware legacy network appliance for processing of the received packet.

10. The computing device of claim 9, the NFV migration controller to update an appliance status table with performance metrics data generated by processing the received packet by the proprietary dedicated hardware legacy network appliance or the selected most reliable NFV appliance.

11. The computing device of claim 10, the NFV migration controller to select the most reliable NFV appliance from the set based at least in part on the packet metadata and the performance metrics data from the appliance status table.

12. The computing device of claim 11, the NFV migration controller to determine if the selected most reliable NFV appliance is valid by checking if updated performance metrics data for the selected most reliable NFV appliance meets a threshold.

13. The method of claim 1, wherein the proprietary dedicated hardware legacy network appliance performs one or more of: firewall services, network address translation (NAT) services, domain name system (DNS) services, load-balancing services, deep packet inspection (DPI) services, transmission control protocol (TCP) optimization services, cache management services, and/or Internet Protocol (IP) address management services.

14. The method of claim 1, wherein the most reliable NFV appliance is based on one or more of: equipment fault metrics, virtualization environment fault metrics, and/or network interface fault metrics.

15. The method of claim 1, wherein the selected most reliable NFV appliance is valid based on reliability and/or performance status information.

16. The method of claim 1, wherein the one or more NFV appliances is to perform one or more of: firewall services, network address translation (NAT) services, domain name system (DNS) services, load-balancing services, deep packet inspection (DPI) services, transmission control protocol (TCP) optimization services, cache management services, and/or Internet Protocol (IP) address management services.

17. The at least one non-transitory machine-readable medium of claim 5, wherein the proprietary dedicated hardware legacy network appliance performs one or more of: firewall services, network address translation (NAT) services, domain name system (DNS) services, load-balancing services, deep packet inspection (DPI) services, transmission control protocol (TCP) optimization services, cache management services, and/or Internet Protocol (IP) address management services.

18. The at least one non-transitory machine-readable medium of claim 5, wherein the most reliable NFV appliance is based on one or more of: equipment fault metrics, virtualization environment fault metrics, and/or network interface fault metrics.

19. The at least one non-transitory machine-readable medium of claim 5, wherein the selected most reliable NFV appliance is valid based on reliability and/or performance status information.

20. The at least one non-transitory machine-readable medium of claim 5, wherein the one or more NFV appliances is to perform one or more of: firewall services, network address translation (NAT) services, domain name system (DNS) services, load-balancing services, deep packet inspection (DPI) services, transmission control protocol (TCP) optimization services, cache management services, and/or Internet Protocol (IP) address management services.

21. The computing device of claim 9, wherein the proprietary dedicated hardware legacy network appliance is to perform one or more of: firewall services, network address translation (NAT) services, domain name system (DNS) services, load-balancing services, deep packet inspection (DPI) services, transmission control protocol (TCP) optimization services, cache management services, and/or Internet Protocol (IP) address management services.

22. The computing device of claim 9, wherein the most reliable NFV appliance is based on one or more of: equipment fault metrics, virtualization environment fault metrics, and/or network interface fault metrics.

23. The computing device of claim 9, wherein the selected most reliable NFV appliance is valid based on reliability and/or performance status information.

24. The computing device of claim 9, wherein the one or more NFV appliances is to perform one or more of: firewall services, network address translation (NAT) services, domain name system (DNS) services, load-balancing services, deep packet inspection (DPI) services, transmission control protocol (TCP) optimization services, cache management services, and/or Internet Protocol (IP) address management services.

\* \* \* \* \*